(12) United States Patent  
Anderson

(10) Patent No.: US 6,697,178 B2
(45) Date of Patent: Feb. 24, 2004

(54) DISK WITH HOLOGRAPHIC SECURITY LABEL APPLIED THERETO AND METHOD OF APPLYING LABEL

(75) Inventor: Michael Jay Anderson, Logan, UT (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/158,333

(22) Filed: May 30, 2002

(65) Prior Publication Data

US 2003/0223100 A1 Dec. 4, 2003

(51) Int. Cl.[7] ................................. G03H 1/00
(52) U.S. Cl. .................. 359/1; 359/3; 283/81
(58) Field of Search .................. 359/1–3; 283/81, 283/82, 86

(56) References Cited

U.S. PATENT DOCUMENTS 5,189,531 A  2/1993  Palmer et al.
6,226,109 B1  5/2001  Tompkin et al.
6,287,661 B1  9/2001  Shigetomi et al.

FOREIGN PATENT DOCUMENTS

| DE | 29620074 U1 | 3/1997 |
|----|----|----|
| EP | 1102267 A2 | 5/2001 |
| GB | 2290526 A | 1/1996 |
| GB | 2341845 A | 3/2000 |
| JP | 8-273331 A | 10/1996 |
| JP | 11-306600 A | 11/1999 |
| WO | WO 00/70537 A1 | 11/2000 |

Primary Examiner—Drew Dunn
Assistant Examiner—Fayez Assaf
(74) Attorney, Agent, or Firm—Thomas H. Magee

(57) ABSTRACT

An optical disk has a holographic security label applied in a recessed portion of the disk. An associated method of applying a holographic label to a recessed portion of an optical disk is also described.

8 Claims, 3 Drawing Sheets

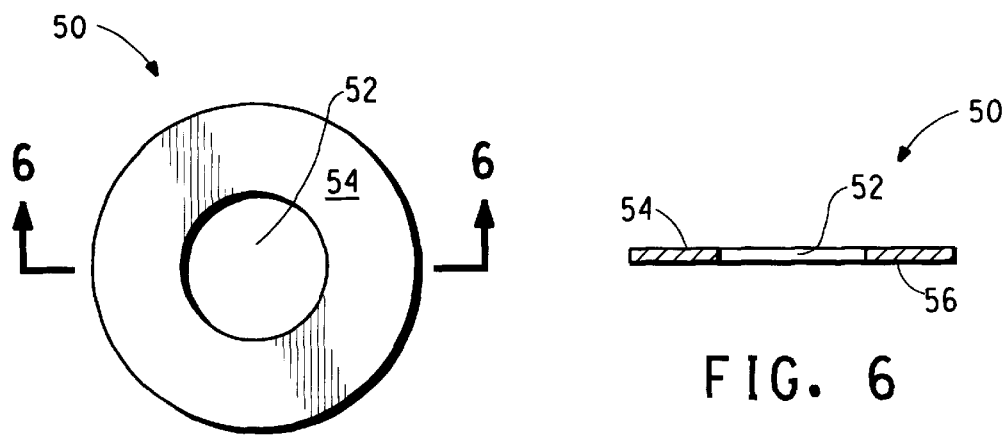
FIG. 5
FIG. 6
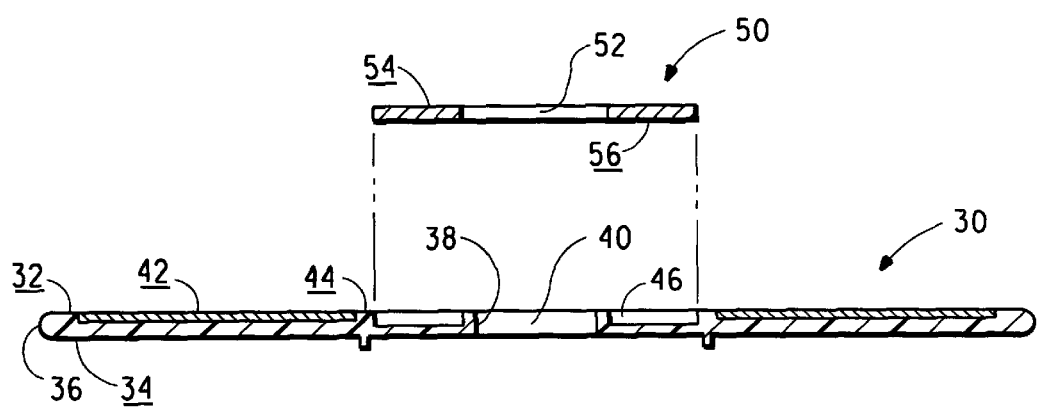
FIG. 7
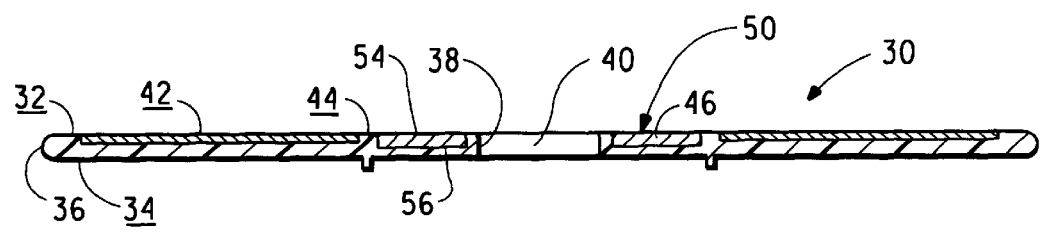
FIG. 8

DISK WITH HOLOGRAPHIC SECURITY LABEL APPLIED THERETO AND METHOD OF APPLYING LABEL

BACKGROUND OF THE INVENTION

1. Field of the Invention

The present invention pertains to an optical disk, e.g., a compact disk (CD), having a holographic security label applied in a recessed portion of the disk. The disk and holographic label in combination are useful as an enhanced security device for the disk.

2. Description of Related Art

Digital optical disks, e.g., compact disks, are widely used as media for valuable computer software and consequently are susceptible to counterfeiting efforts. The use of a hologram for identification purposes on an optical disk is known. In the majority of prior art references, such a hologram is a surface-relief hologram formed by a stamping process such that the hologram is an integral part of the disk. In this case, the hologram must withstand all processing conditions used in disk fabrication, such that significant limitations are placed on these processing conditions in order for the hologram to not undergo significant damage during processing. Prior art of this type is Japanese Patent Publication 11-306600 and German Patent DE 29620074 U1.

In a few cases in the prior art, there are disclosures of a hologram (which can be a volume-phase hologram) being formed independently with respect to fabrication of the digital optical disk and then being applied to a flat, non-recessed area of the disk. Disclosures of this type are German Patent DE 29620074 U1 and European Patent Publication EP 1102267. While forming the hologram independently of disk fabrication and then applying the hologram as a label to the fabricated disk is advantageous in not limiting the processing conditions for disk fabrication, there is a significant drawback to this approach in that the holographic label can often be easily removed intact by a forger and then reapplied intact to another disk having more valuable software encoded in it to convey the impression that a non-authentic disk is authentic. A holographic label applied in this manner thus has limited value as a security device.

There is a significant need for a holographic label that can be applied to a digital optical disk after fabrication of the disk as a security device and in a manner such that the label cannot be removed in a counterfeiting action without the label undergoing significant or even total degradation. The present invention provides a solution to this important need.

SUMMARY OF THE INVENTION

A disk has a holographic label applied to the disk as an enhanced security device in a manner such that the holographic label cannot be removed without significant or even total destruction of the label. The disk has a top surface and a bottom surface joined by a peripheral outer edge and an opposed inner edge that defines a circular hole at the center of the disk. The disk contains recorded information disposed between the outer edge and a circular hub adjacent the inner edge with the hub supporting the holographic label for the disk. The holographic label is photopolymerized film containing a hologram disposed in a recessed portion of the hub between the top and bottom surfaces, wherein the photopolymerized film containing the hologram is pressed into the recessed portion.

The holographic label can be any shape and can vary in size as a percentage of the hub size ranging from a very small percentage (<1 percent) to 100 percent. Similarly, the recessed portion of the hub can vary in shape and size in relation to the whole hub in the same manner. In a preferred embodiment, the recessed portion comprises a donut-shaped opening below the top surface. In another preferred embodiment, the hologram is a volume phase hologram. In still another preferred embodiment, the hub is clear and a side of the photopolymerized film that is adjacent to the disk contains a graphic image.

The invention also includes a method of applying a holographic security label to a disk having a top surface and a bottom surface joined by a peripheral outer edge and an opposed inner edge that defines a circular hole at the center of the disk, the disk containing recorded information disposed between the outer edge and a circular hub adjacent the inner edge, comprising the steps of:

a) positioning photopolymerized film containing a hologram adjacent a recessed portion in the hub between the top and bottom surfaces; and b) pressing the film into the recessed portion of the hub.

Preferred embodiments of the above method include 1) the method wherein the recessed portion comprises a donut-shaped opening below the top surface, 2) the method wherein the hologram is a volume phase hologram, and 3) the method wherein the hub is clear and a side of the photopolymerized film that is adjacent to the disk contains a graphic image.

BRIEF DESCRIPTION OF THE DRAWINGS

FIG. 5 is a top view of a donut-shaped holographic label 50 suitable for placement within the recessed portion 46 of the disk 30.

FIG. 6 is a cross-sectional view taken along line 6—6 of FIG. 5.

FIG. 7 is a cross-sectional view of the disk 30 shown in FIG. 4 with the holographic label 50 of FIG. 6 lying above the recessed portion 46 prior to being pressed into the recessed portion 46.

FIG. 8 is a cross-sectional view of the disk 30 shown in FIG. 4 with the holographic label 50 of FIG. 6 pressed into the recessed portion 46 according to the invention.

DETAILED DESCRIPTION OF THE PREFERRED EMBODIMENT(S)

Figure 1:
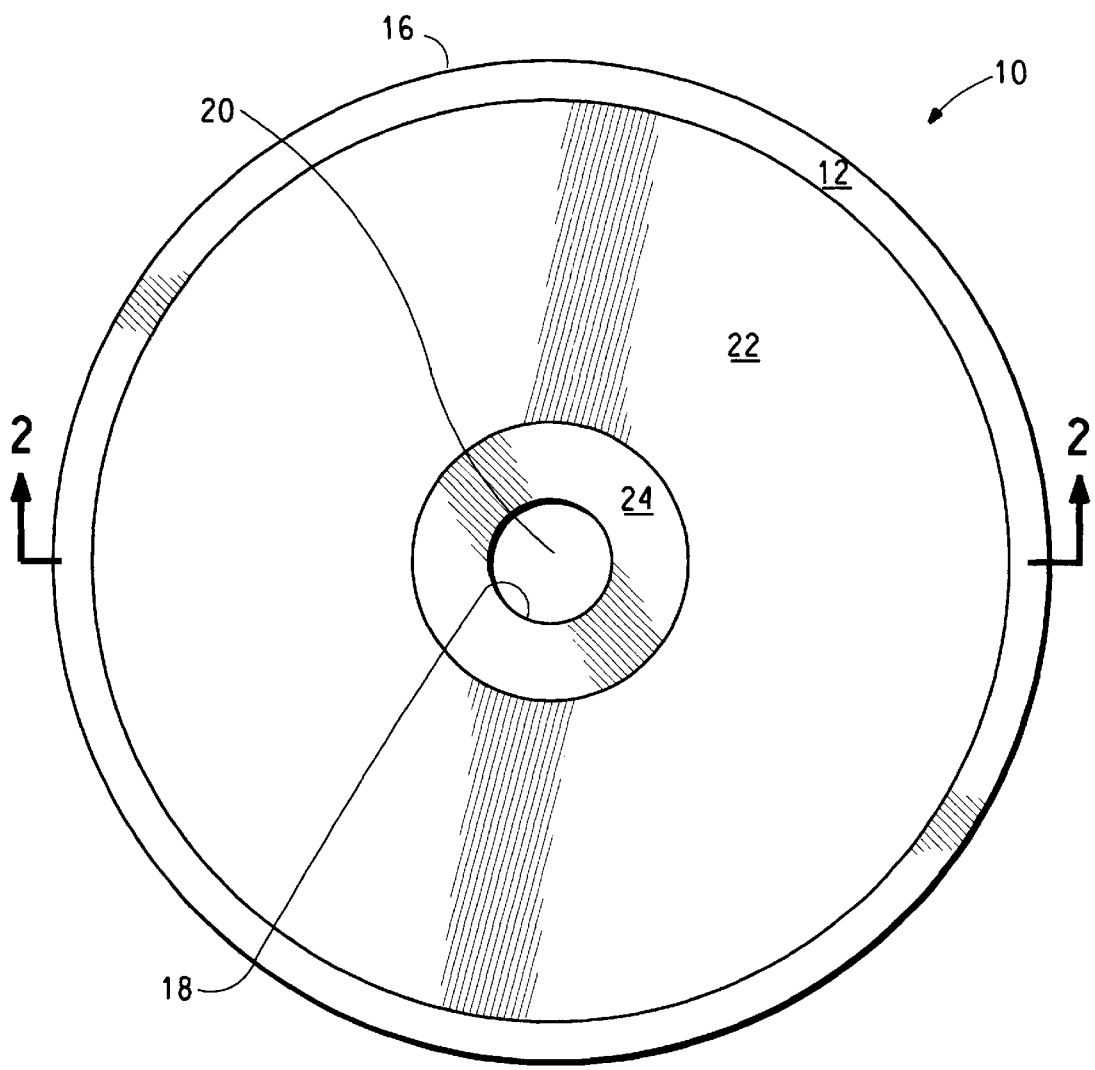
FIG. 1 is a top view of a typical optical disk 10 containing a circular hole 20, a hub 24 and a metallized medium 22.
Figure 2:
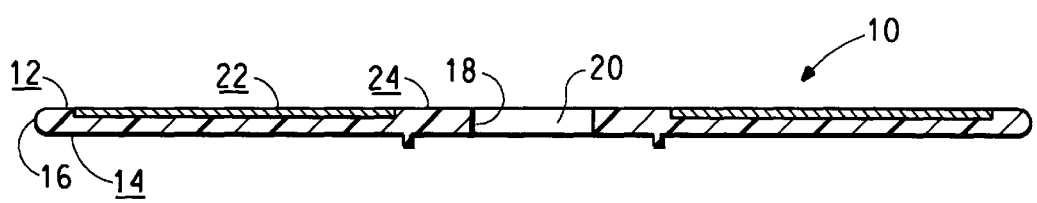
FIG. 2 is a cross-sectional view taken along line 2—2 of FIG. 1.

FIGS. 1 and 2 show a typical optical disk 10 having a top surface 12 and a bottom surface 14 joined by a peripheral outer edge 16 and an opposed inner edge 18 that defines a circular hole 20 at the center of the disk 10. The circular hole 20 has a diameter of approximately 15 millimeters (mm). The disk 10 contains recorded information which is usually stored in a metallized medium 22 disposed between the outer edge 16 and a circular hub 24 adjacent the inner edge 18. The hub 24 is generally a donut-shaped ring having a width of approximately 10 millimeters and containing no digital information. The hub 24 is typically transparent with no coloration, but it can be any color. Immediately outside the hub 24 is the metallized medium 22, which is another donut-shaped ring having a width of approximately 41 millimeters where digital information is stored.

The hub 24 may support a holographic label for the disk 10 comprising, for example, an embossed hologram. Use of a hologram provides for one level of anti-counterfeiting security for an optical disk, since holographic imaging requires specialized equipment, e.g., lasers, techniques and expertise that would-be counterfeiters are less likely to possess.

Figure 3:
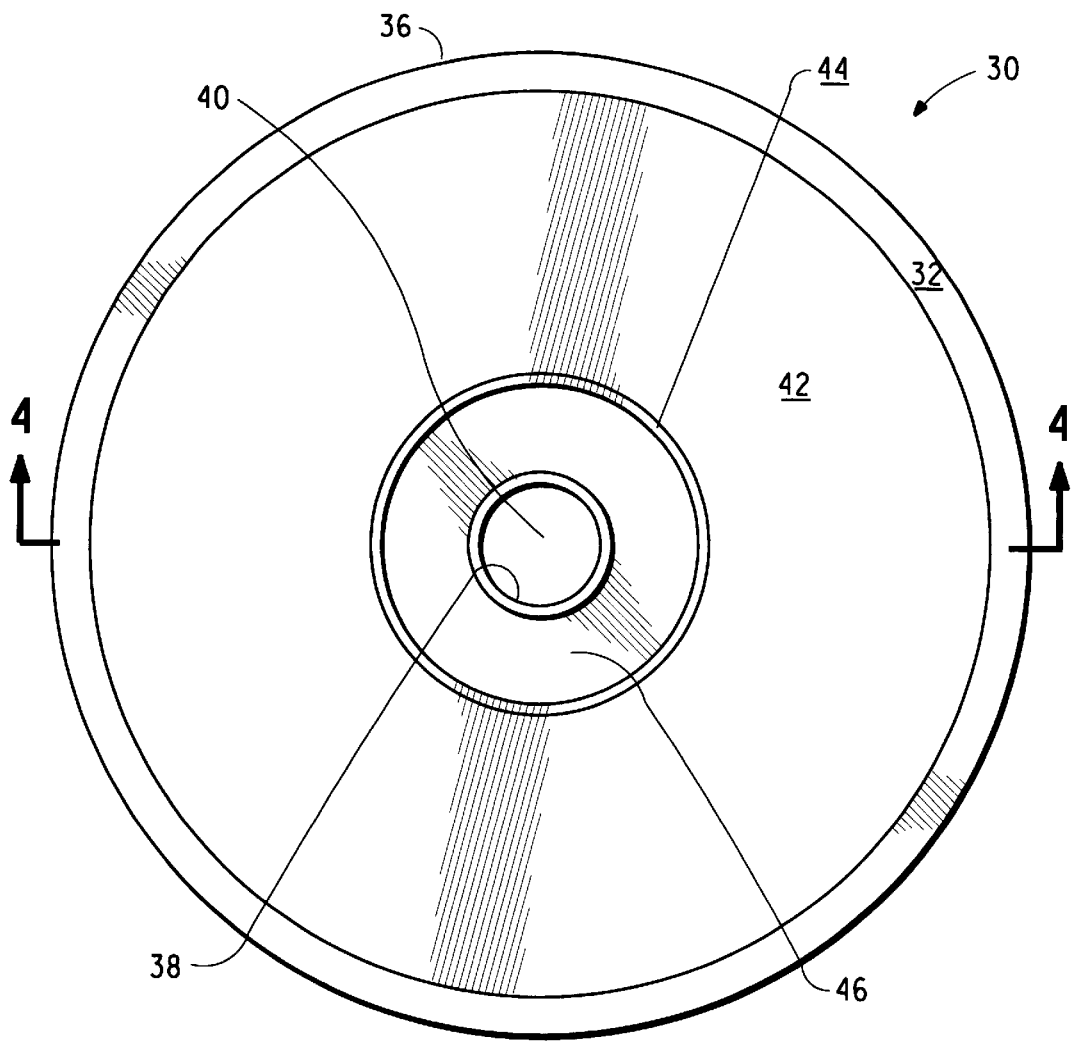
FIG. 3 is a top view of an optical disk 30 having a recessed portion 46 in the hub 44 between the top and bottom surfaces 32 and 34.
Figure 4:
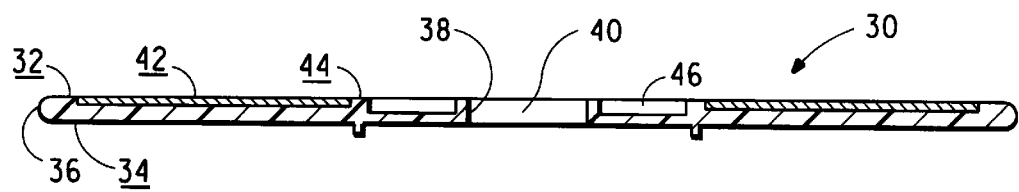
FIG. 4 is a cross-sectional view taken along line 4—4 of FIG. 3.

FIGS. 3 and 4 show an optical disk 30 similar to the optical disk 10 with a top surface 32 and a bottom surface 34 joined by a peripheral outer edge 36 and an opposite inner edge 38 that defines a circular hole 40 at the center of the disk 30. The disk 30 contains recorded information stored in a metallized medium 42 disposed between the outer edge 36 and a circular hub 44 adjacent to the inner edge 38. The disk 30 has a recessed portion 46 in the hub 44 between the top and bottom surfaces 32 and 34. In the present embodiment, the recessed portion 46 comprises a donut-shaped opening below the top surface 32. The present invention provides for an additional and very significant level of anti-counterfeiting security by virtue of the hub 44 having this recessed portion 46 into which is pressed a holographic label comprising photopolymerized film containing a hologram. When a holographic label is adhesively bonded in place inside the recessed portion 46 of the hub 44 such that there is little or no relief of the label with repect to the top surface 32 of the disk 30, it is virtually impossible to remove the label intact as a would-be forger might want to do in a counterfeiting operation.

FIGS. 5 and 6 show a holographic label 50 which is suitable for placement within the recessed portion 46 of the disk 30. The label 50 is donut-shaped with a circular hole 52 at the center that joins top and bottom surfaces 54 and 56. The holographic label 50 is first created from photopolymerizable film using any (one or more) holographic imaging techniques known in the art to produce a volume phase hologram or a surface relief hologram in the film. A volume phase hologram is preferred. The holographic label 50 can be any size and shape provided the label 50 is contained completely within the recessed portion 46 of the hub 44.

FIG. 7 shows the disk 30 of FIG. 4 with the holographic label 50 of FIG. 6 lying above the recessed portion 46 prior to being pressed into the recessed portion 46 according to the invention. In a preferred embodiment, the holographic label 50 is donut-shaped and is designed to fit snugly within the donut-shaped recessed portion 46 of the hub 44. A donut-shape for the label 50 is preferred because such a symmetrical shape does not cause the disk 30 to be off-balance while it spins in use within a CD drive.

FIG. 8 shows the disk 30 of FIG. 4 with the holographic label 50 of FIG. 6 pressed into the recessed portion 46 according to the invention. The thickness of the holographic label 50 is not limited with respect to the depth of the recessed portion 46 of the hub 44 other than requiring the label 50 to be completely contained within the recessed portion 46. It is preferred that the thickness of the label 50 be approximately equal to the depth of the recessed portion 46 of the hub 44, since this will result in a flush or nearly-flush surface on the disk 30 and make it difficult or impossible to remove the label 50 intact. Furthermore, it is preferred that the size of the donut-shaped label 50 be essentially the same as that of the recessed portion 46 of the disk 30, such that the label 50 just fits into the recessed portion 46. There will need to be a small tolerance gap that allows the label applicator to press the film containing the hologram into the recessed portion 46 of the hub 44. It may be possible to insert a tool, e.g., a knife, into this small gap in the recessed portion 46 but, because the knife can't be inserted flat in relation to the holographic label 50, it would be practically impossible to remove the label 50 intact (as would be done or attempted in counterfeiting).

In this invention, it is preferred that the hub 44 of the disk be clear (transparent). In this case, the bottom side 56 of the holographic label 50 comprising photopolymerized film containing a hologram, can also contain a graphic image that will be viewable through the transparent hub 44 when this graphic image side 56 is adjacent to the disk 30.

In other embodiments, the invention is a method of applying a holographic security label 50 to a disk 30 of the type described above. The method comprises the steps of:

a) positioning photopolymerized film containing a hologram adjacent a recessed portion in the hub between the top and bottom surfaces; and b) pressing the film into the recessed portion of the hub.

In a preferred embodiment, the method is effected on a disk having a recessed portion that comprises a donut-shaped opening below the top surface of the disk. In another preferred embodiment, the method is effected using a hologram that is a volume phase hologram. In yet another preferred embodiment, the method is effected on a disk having a clear hub and a side of the holographic security label, comprising photopolymerized film containing a graphic image, that is adjacent to the disk contains a graphic image. The aforementioned method steps of a) positioning and b) pressing the film can be effected using any techniques known to the art of applying a label. Both the positioning and pressing steps can be done manually, automatically with machine(s), and in combination. Preferably, the method of applying the holographic security label to the disk includes applying adhesive to the security label and/or to the recessed portion of the hub prior to performing the pressing step b) to effect bonding of the label to the disk.

EXAMPLE 1

This example illustrates the high efficacy of a holographic label pressed into a recessed portion in the hub of a digital optical disk, e.g., a CD, as an anti-counterfeiting device.

A donut-shaped holographic label was made using Omnidex® 734 holographic recording film (E. I. DuPont de Nemours and Company, Wilmington, Del.). Holographic imaging was done using well-known holographic imaging techniques effected with an i90, 20 watt laser as the source of coherent light (Coherent, Inc., Santa Clara, Calif.). The resulting holographic label contained holographic images of jigsaw puzzle pieces fitted together as well as a company name, a product name of a well-known commercial software product from this company, and the word "Genuine". The donut-shaped holographic label had an outer circular diameter of about 3.2 centimeters and an inner circular diameter of about 1.7 centimeters. The thickness of the label was 114 microns. The holographic images were orange-green-gold in color (depending upon viewing angle) on a black background and were viewable from one side only of the holographic label, which side is termed the holographic viewing side. The opposite side of the holographic label exhibited non-holographic graphic images containing text information in multicolors (orange, green, blue, yellow) on a black background. This text information included a company name and the word "Genuine". This (opposite) side of the holographic label is termed the graphic viewing side. The graphic information printed on the graphic viewing side was done using flexographic printing by DuPont Authentication Systems, Bridgeport, Conn.

An unlabeled CD having a recessed donut-shaped portion of the hub was created by machine milling at DuPont Authentication Systems (Logan, Utah). The milling was done on a standard (non-recessed) CD to create the recessed portion in the hub. The hub portion was transparent. Commercially available liquid adhesive (National Starch 80-1194 Permanent Acrylic Adhesive, Meridosia, Ill.) transparent to visible light was used to bond the label to the CD to afford a labeled CD. A thin layer of the liquid adhesive was applied to the graphic viewing side of the holographic label. The holographic label was then manually aligned with the recessed portion of the hub of the unlabeled CD and pressed into the recessed portion such that it was completely contained within the recessed portion. Curing of the adhesive was achieved by applying the label and letting it sit under ambient conditions for 24 hours. Since the recessed portion of the hub of the CD and the adhesive are transparent, the graphic images seen from observation of the graphic viewing side were still viewable following bonding of the label to make the labeled CD.

Following curing, an attempt (as a would-be forger might do) using a knife was made to remove the holographic label intact from the labeled CD. The label could not be removed intact but only in small pieces such that there was virtually total destruction of the label. Thus, a potential forger would be totally unsuccessful in removing an authentic label from a labeled CD made according to this invention for subsequent application to a forged (non-authentic) CD.

COMPARATIVE EXAMPLE 1 (PROPHETIC)

The donut-shaped holographic label is made as in Example 1. The bonding of the label with commercial transparent adhesive is done in the same manner as in Example 1 except that the bonding of the label is made to the hub area of a CD that does not have a recessed portion. Since the hub is not recessed in this case, the applied label has relief in relation to the hub surface.

Following curing, the holographic label is easily removed completely intact with no noticeable defects with a knife. This ease of removal with the label intact would result in a would-be forger being much more likely to have success in removing a label from an authentic CD for subsequent application to a non-authentic (forged) CD.

What is claimed is:

1. In a disk having a top surface and a bottom surface joined by a peripheral outer edge and an opposed inner edge that defines a circular hole at the center of the disk, the disk containing recorded information disposed between the outer edge and a circular hub adjacent the inner edge with the hub supporting a holographic label for the disk, the improvement comprising the holographic label being photopolymerized film containing a hologram disposed in a recessed portion of the hub between the top and bottom surfaces, wherein the photopolymerized film containing the hologram is pressed into the recessed portion.

2. The disk of claim 1 wherein the recessed portion comprises a donut-shaped opening below the top surface.

3. The disk of claim 1 wherein the hologram is a volume phase hologram.

4. The disk of claim 1 wherein the hub is clear and a side of the photopolymerized film that is adjacent to the disk contains a graphic image.

5. A method of applying a holographic security label to a disk having a top surface and a bottom surface joined by a peripheral outer edge and an opposed inner edge that defines a circular hole at the center of the disk, the disk containing recorded information disposed between the outer edge and a circular hub adjacent the inner edge, comprising the steps of:

a) positioning photopolymerized film containing a hologram adjacent a recessed portion in the hub between the top and bottom surfaces; and b) pressing the film into the recessed portion of the hub.

6. The method of claim 5 wherein the recessed portion comprises a donut-shaped opening below the top surface.

7. The method of claim 5 wherein the hologram is a volume phase hologram.

8. The method of claim 5 wherein the hub is clear and a side of the photopolymerized film that is adjacent to the disk contains a graphic image.

\* \* \* \* \*